(12) United States Patent
Choi et al.

(10) Patent No.: US 8,750,357 B1
(45) Date of Patent: Jun. 10, 2014

(54) SYSTEMS AND METHODS FOR ESTIMATING SIGNAL TO INTERFERENCE AND NOISE POWER RATIO IN MULTIPLE DOMAINS

(75) Inventors: Jiwoong Choi, Sunnyvale, CA (US); Jungwon Lee, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 601 days.

(21) Appl. No.: 12/775,850

(22) Filed: May 7, 2010

Related U.S. Application Data (60) Provisional application No. 61/183,858, filed on Jun. 3, 2009.

(51) Int. Cl.
*H04B 17/00* (2006.01)
(52) U.S. Cl.
USPC ............. 375/227; 455/67.13; 455/226.2; 455/226.3; 714/704
(58) Field of Classification Search
CPC ...... H04L 1/20; H04B 17/006; H04B 1/1027; H04B 17/0042; G01R 31/31708; G01R 29/26
USPC ............. 375/224, 227, 228; 455/67.13, 135, 455/226.2, 226.3; 714/704
See application file for complete search history.

(56) References Cited

U.S. PATENT DOCUMENTS

| | | | |
|---|---|---|---|
| 6,266,422 B1 * | 7/2001 | Ikeda | 381/71.11 |
| 7,246,045 B1 * | 7/2007 | Rappaport et al. | 703/2 |
| 7,356,071 B2 * | 4/2008 | Li et al. | 375/147 |
| 7,484,136 B2 * | 1/2009 | Qiu | 714/704 |
| 7,729,663 B2 * | 6/2010 | Qiu et al. | 455/67.11 |
| 2007/0217495 A1 * | 9/2007 | Han et al. | 375/227 |
| 2008/0022161 A1 * | 1/2008 | Qiu et al. | 714/704 |
| 2008/0022162 A1 * | 1/2008 | Qiu | 714/704 |
| 2008/0144708 A1 * | 6/2008 | Tsuie et al. | 375/227 |
| 2010/0215128 A1 * | 8/2010 | De Laurentiis et al. | 375/329 |

FOREIGN PATENT DOCUMENTS

JP  2001-156865  * 6/2001 ............. H04L 27/18

OTHER PUBLICATIONS

D. Tse and P. Viswanath, "Fundamentals of Wireless Communication", 2005, Cambridge University Press, 2005, Chapter 2. p. 10.*

* cited by examiner

*Primary Examiner* — Sophia Vlahos (57) ABSTRACT

Systems and methods for computing a signal to interference and noise power ratio estimate based on multiple domains are provided. A signal transmitted through a fading channel from a wireless transmission source is received. First estimates of (a) signal power of the received signal and (b) noise power of the received signal are computed in a first domain separately. Second estimates of (a) the signal power of the received signal and (b) the noise power of the received signal are computed in a second domain separately. The second domain is different from the first domain. The SINR estimate is determined based on one of the first and second estimates that indicate less variation in the fading channel.

20 Claims, 3 Drawing Sheets

SYSTEMS AND METHODS FOR ESTIMATING SIGNAL TO INTERFERENCE AND NOISE POWER RATIO IN MULTIPLE DOMAINS

CROSS-REFERENCE TO RELATED APPLICATION

This disclosure claims the benefit under 35 U.S.C. §119(e) of U.S. Provisional Application No. 61/183,858, filed Jun. 3, 2009 which is hereby incorporated by reference herein in its entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

Conventional systems determine a signal to interference and noise power ratio (SINR) estimate by computing an estimated average of the desired signal power (signal power) and an estimated variance of the noise plus interference power (noise power). The SINR corresponds to the ratio of the signal power to the noise power. These conventional systems compute the signal and noise power estimates in a single domain and are effective when the channel is relatively slowly fading in the time domain and less frequency selective in the frequency domain. However, such single domain estimation is ineffective for determining SINR estimates for channels that experience fast fading in the time domain or large frequency selective fading in the frequency domain.

SUMMARY

In view of the foregoing, systems and methods for estimating signal to interference and noise power ratio in multiple domains in accordance with various embodiments of the present disclosure are provided.

In some embodiments, a signal transmitted through a fading channel from a wireless transmission source is received. First estimates of (a) signal power of the received signal and (b) noise power of the received signal are computed in a first domain separately. Second estimates of (a) the signal power of the received signal and (b) the noise power of the received signal are computed in a second domain separately. The second domain is different from the first domain. The SINR estimate is determined based on one of the first and second estimates that indicate less variation in the fading channel. In some implementations, the signal is an orthogonal frequency division multiplexing (OFDM) signal. In some implementations, the first domain and the second domain are a time domain, a frequency domain, or a time and frequency domain.

In some embodiments, a first SINR estimate of the received signal is computed based on the first estimates. A second SINR estimate of the received signal is computed based on the second estimates. A determination is made as to which of the first SINR estimate and the second SINR estimate has a larger value. The one of the first SINR estimate and the second SINR estimate with the larger value is selected as the SINR estimate of the received signal.

In some embodiments, the first estimates and the second estimates are computed by computing, in the first domain, a first auto-correlation value corresponding to the first estimates and computing, in the second domain, a second auto-correlation value corresponding to the second estimates. A determination is made as to which of the first auto-correlation value and the second auto-correlation value has a larger value, where one of the first and second auto-correlation values with the larger value indicates less variation in the channel. The SINR estimate is determined by computing the SINR estimate based on one of the first and second auto-correlation values with the larger value. In some implementations, the first and second auto-correlation values are computed for the first and second signal power estimates in the first and the second domains, respectively. In some implementations, the first and second noise power estimates are computed in accordance with a noise power channel estimation filter in the first and the second domains, respectively.

In some embodiments, when the first estimates are determined to indicate less variation in the channel, the first estimate of the signal power is divided by the first estimate of the noise power to produce the SINR estimate.

In some embodiments, third estimates in a third domain of (a) the signal power of the received signal and (b) the noise power of the received signal are computed separately. The third domain is different from the first and the second domains. The SINR estimate is determined based on one of the first, the second and the third estimates that indicate less variation in the fading channel. Any number of additional estimates computed in domains that are different from each other may be used in determining the best SINR estimate that indicates less variation in the fading channel although only two or three are discussed.

In some embodiments, the first estimate of the signal power is computed in accordance with a signal power channel estimation filter in the first domain. The first estimate of the noise power is computed in accordance with a noise power channel estimation filter in the first domain. The second estimate of the signal power is computed in accordance with the signal power channel estimation filter in the second domain. The second estimate of the noise power is computed in accordance with the noise power channel estimation filter in the second domain.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The present disclosure generally relates to computing SINR estimates based on multiple domains. In particular, signal power estimates and noise power estimates are computed in multiple domains. The SINR is determined based on the signal power estimate and noise power estimate of the domain that indicates less variation in the fading channel.

Figure 1:
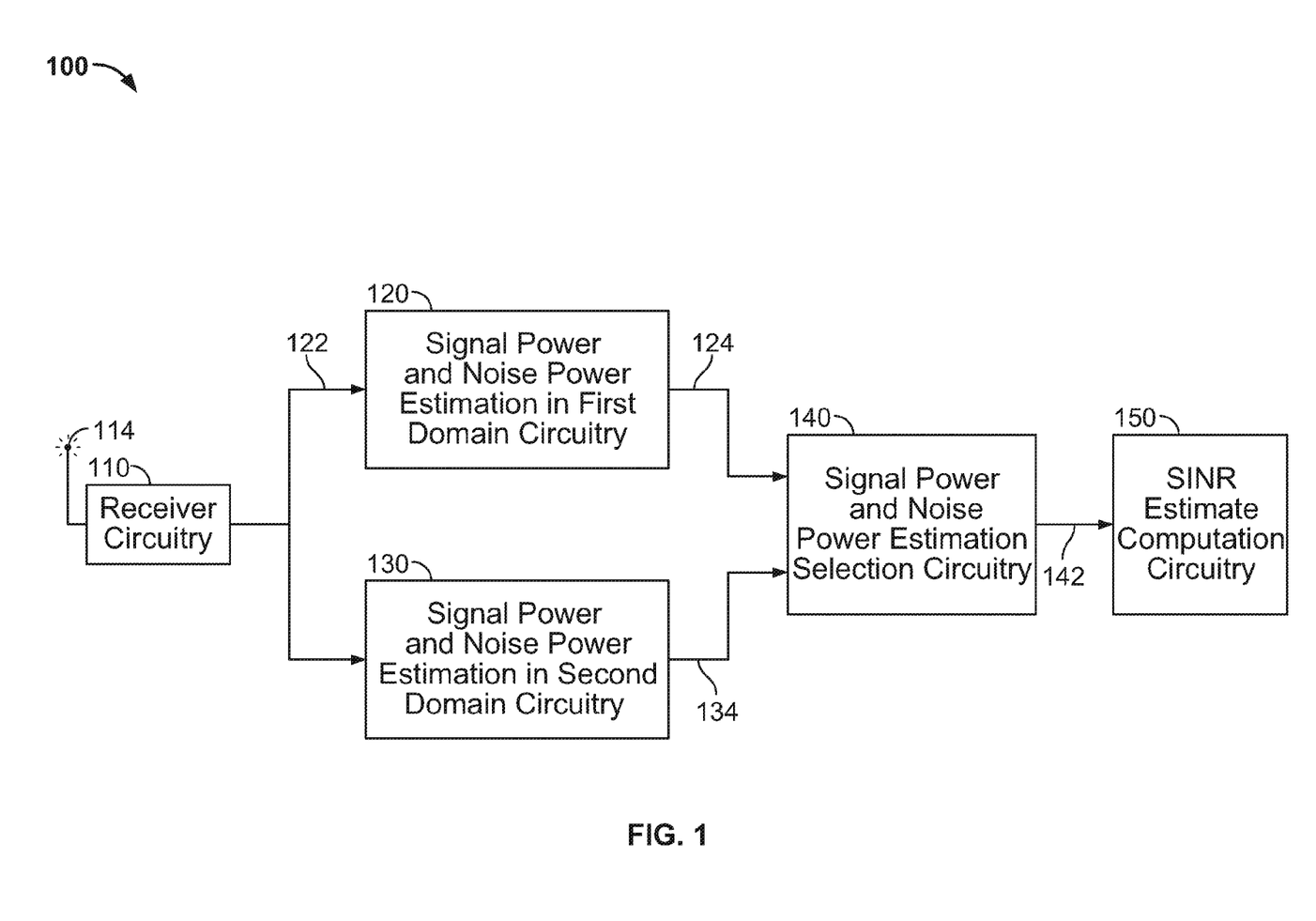
FIG. 1 shows an illustrative SINR estimation based on multiple domains system in accordance with an embodiment of the present disclosure.

FIG. 1 shows an illustrative SINR estimation based on multiple domains system 100 in accordance with an embodiment of the present disclosure. System 100 includes receiver circuitry 110, signal power and noise power estimation in first domain circuitry 120, signal power and noise power estimation in second domain circuitry 130, signal power and noise power estimation selection circuitry 140, and SINR estimate computation circuitry 150. The components shown in FIG. 1 may be implemented by a single integrated circuit (IC) or as separate components in a circuit board or implemented on a programmable logic device. The components shown in FIG. 1 may be implemented on separate devices or circuits and networked together.

Receiver circuitry 110 may include circuitry necessary for receiving a signal over a high or low frequency communications channel using one or more antennas 114. For example, receiver circuitry 110 may include an encoder, decoder, analog-to-digital converter (ADC), digital-to-analog converter (DAC), one or more analog and/or digital filters, one or more equalizers, modulators, power amplifiers and any other suitable component necessary to receive a data and/or pilot signal over a high or low frequency wireless communications medium. The received signal model in orthogonal frequency division multiplexing (OFDM) systems where $Y_m[k]$ is the received signal is represented in accordance with equation (1) below:

$$Y_m[k] = \sqrt{B} X_m[k] H_m[k] + Z_m[k] \tag{1}$$

where m is a time index, k is a frequency index, B is the boosting power of the pilot signal and may be a predetermined value, $X_m[k]$ is the pilot signal, $H_m[k]$ is the channel gain, $Z_m[k]$ is the noise signal $C(0, \sigma_Z^2)$.

In some implementations, a pilot signal is an OFDM training signal transmitted at regular intervals. The pilot signal may include a preamble with a reference to allow receiver circuitry 110 to identify the originally transmitted values. This allows receiver circuitry 110 to determine the transmitted signal unaffected by the communications channel. In some implementations, the pilot signal is spaced by $N_t$ symbols in time and $N_f$ subcarriers in frequency, respectively. The pilot signal may be scattered in multiple dimensions.

Receiver circuitry 110 may provide the received signal $Y_m[k]$ as well as the expected signal $X_m[k]$ to signal power and noise power estimation in first domain circuitry 120 and to signal power and noise power estimation in second domain circuitry 130 over communications link 122. Although FIG. 1 shows only two different circuitries for computing signal and noise power estimates in two domains any number of additional circuitries may be provided to compute signal and noise power estimates in any number of additional domains that are different from each other. For example, a third circuitry may be added and coupled to communications link 122 to compute signal power and noise power estimates in a third domain of the received signal. As discussed in more detail below in connection with FIG. 2, the signal power estimate computation may differ from the noise power estimate computation. In particular, the channel estimation (CE) filter for the signal power estimation may differ from that used for noise power estimation.

In some embodiments, signal power and noise power estimation in first domain circuitry 120 may compute the signal power of the received signal in the time domain and the noise power in the frequency domain. Similarly, signal power and noise power estimation in second domain circuitry 120 may compute the signal power of the received signal in the frequency domain and the noise power in the time domain. In some implementations, signal power and noise power estimation in first domain circuitry 120 may compute the signal power of the received signal and the noise power of the received signal in the frequency domain. Similarly, signal power and noise power estimation in second domain circuitry 130 may compute the signal power of the received signal and the noise power of the received signal in the time domain. In some implementations, signal power and noise power estimation in first domain circuitry 120 may compute the signal power of the received signal and/or the noise power of the received signal in the time and frequency domain.

In some embodiments, signal power and noise power estimation in second domain circuitry 130 may compute the signal power of the received signal in the time domain and the noise power in the frequency domain. The domains used for computing the signal power and noise power in circuitry 130 are different from the domains used to compute the signal power and noise power in circuitry 120. For example, signal power and noise power estimation in second domain circuitry 130 may compute the signal power of the received signal in the frequency domain and the noise power in the time domain while signal power and noise power estimation in first domain circuitry 120 computes the signal power of the received signal in the time domain and the noise power in the frequency domain. In some implementations, signal power and noise power estimation in second domain circuitry 130 may compute the signal power of the received signal and the noise power of the received signal in the frequency domain. In some implementations, signal power and noise power estimation in second domain circuitry 130 may compute the signal power of the received signal and/or the noise power of the received signal in the time and frequency domain while signal power and noise power estimation in first domain circuitry 120 computes the signal power and noise power in the time or frequency domain.

In general, the first domain may include any combination of frequency, time, and time and frequency for the signal power and/or noise power estimation and the second domain may include any combination of frequency, time, and time and frequency for the signal power and/or noise power estimation that is different from the first domain. Also, although the signal power and noise power estimation is shown as being computed in two different domains in parallel using circuitries 120 and 130, each signal power and noise power estimation may be computed in a different domain sequentially using a single circuitry or processor. For example, the signal power and noise power estimation in a first domain may be computed and these first set of values of the signal power and noise power estimation may be stored in a memory. The signal power and noise power estimation in a second domain may subsequently be computed using the same or different circuitry and these second set of values of the signal power and noise power estimation may be stored at a different location in the memory. The values of the signal power and noise power estimations corresponding to different domains may be retrieved from the memory and provided to signal power and noise power estimation selection circuitry 140 for further processing.

In some embodiments, signal power and noise power estimation in first domain circuitry 120 provides the estimates of the signal power and noise power through communications link 124 to signal power and noise power estimation selection circuitry 140. Signal power and noise power estimation in second domain circuitry 130 may provide the estimates of the signal power and noise power through communications link 134 to signal power and noise power estimation selection circuitry 140. Signal power and noise power estimation selection circuitry 140 processes the signal power and noise power estimates received over communication links 124, 134 to determine which of the first domain and second domain experiences smaller channel variation. For example, signal power and noise power estimation selection circuitry 140 may determine that there exists less channel variation in the time domain and that the first domain is the time domain. Accordingly, signal power and noise power estimation selection circuitry 140 may select the estimates of the signal power and noise power received over communication link 124 from signal power and noise power estimation in first domain circuitry 120. The estimates of the signal power and noise power selected by signal power and noise power estimation selection circuitry 140 are provided over communications link 142 to SINR estimate computation circuitry 150. Signal power and noise power estimation selection circuitry 140 is discussed in more detail below in connection with FIG. 3.

In some embodiments, signal power and noise power estimation selection circuitry 140 may compute an SINR value for each set of estimates that signal power and noise power estimation selection circuitry 140 receives over communication links 124 and 134. For example, signal power and noise power estimation selection circuitry 140 may compute a first SINR estimate corresponding to the first domain based on the signal power and noise power estimates that signal power and noise power estimation selection circuitry 140 receives from signal power and noise power estimation in first domain circuitry 120. Similarly, signal power and noise power estimation selection circuitry 140 may compute a second SINR estimate corresponding to the second domain based on the signal power and noise power estimates that signal power and noise power estimation selection circuitry 140 receives from signal power and noise power estimation in second domain circuitry 130.

Signal power and noise power estimation selection circuitry 140 may compare the first SINR estimate with the second SINR estimate to determine which of the first and second SINR estimates is greater. In particular, signal power and noise power estimation selection circuitry 140 may compute the maximum of the first SINR estimate and the second SINR estimate. Signal power and noise power estimation selection circuitry 140 may determine that the larger SINR estimate corresponds to the domain which experiences less channel variation. Accordingly, signal power and noise power estimation selection circuitry 140 may provide the larger of the computed SINR estimates as the SINR estimate of the received signal to utilization circuitry (not shown) for further processing. Alternatively, signal power and noise power estimation selection circuitry 140 may provide over communication link 142 the signal power and noise power estimates corresponding to the domain having the least channel variation (e.g., the domain corresponding to the larger of the computed first and second SINR estimates) to SINR estimate computation circuitry 150. SINR estimate computation circuitry 150 may compute the ratio of the received signal power estimate to the noise power estimate to evaluate or determine the SINR of the received signal $Y_m[k]$.

Utilization circuitry may include various analog or digital processing circuitries. For example, utilization circuitry may be a digital signal processor or a microprocessor. In some implementations, utilization circuitry may include transmitter/receiver circuitry.

In some embodiments, signal power and noise power estimation selection circuitry 140 may compute auto-correlation values in multiple, domains and identify the domain with the least channel variation based on the domain having the greatest correlation values. For example, signal power and noise power estimation selection circuitry 140 may compute a time domain auto-correlation value and a frequency domain auto-correlation value. In addition, signal power and noise power estimation selection circuitry 140 may determine that the time domain has the least channel variation because the time domain auto-correlation value is greater than the frequency domain auto-correlation value. Accordingly, signal power and noise power estimation selection circuitry 140 may select the signal power and noise power estimates received from the signal power and noise power estimation circuitry 120 or 130 corresponding to the time domain. In particular, when signal power and noise power estimation in first domain circuitry 120 corresponds to the time domain, signal power and noise power estimation selection circuitry 140 may select the signal power and noise power estimates received from circuitry 120 for provision to SINR estimate computation circuitry 150.

In some embodiments, the time-domain auto-correlation value may be computed in accordance with:

$$\text{Real}\left(\sum_{m=0}^{N_S-1} \sum_{k \in P_m} \tilde{H}_m[k]\tilde{H}^*_{m+N_t}[k]\right)$$

the frequency domain auto-correlation value may be computed in accordance with:

$$\text{Real}\left(\sum_{m=0}^{N_S-1} \sum_{k \in P_m} \tilde{H}_m[k]\tilde{H}^*_m[k+N_f]\right)$$

and the time and frequency auto-correlation value may be computed in accordance with:

$$\text{Real}\left(\sum_{m=0}^{N_S-1} \sum_{k \in P_m} \tilde{H}_m[k]\tilde{H}^*_{m+N_t}[k+N_f]\right)$$

where $\hat{H}_m[k]$ is the channel estimate, $\tilde{H}^*_m[k]$ is the conjugate of the channel estimate, $N_s$ is the number of pilot symbols in the pilot signal, $N_t$ and $N_f$ are respectively the pilot spacing in time and frequency, $P_m$ is the set of pilot subcarriers, m is the time index and k is the frequency index.

In some implementations, signal power and noise power estimation selection circuitry 140 may compute a third domain auto-correlation value in the time and frequency domain. Signal power and noise power estimation selection circuitry 140 may identify the domain with the least channel variation based on the greatest of the time domain, frequency domain and time and frequency domain auto-correlation values. Signal power and noise power estimation selection circuitry 140 may implement any other suitable method in addition to those discussed above and below to select and identify the domain with the least channel variation to select the signal power and noise power estimates corresponding to that domain for computation of the SINR estimate.

The communication links 122, 124, 134 and 142 may be any wired or wireless paths or combinations of the same.

As discussed above, signal power and noise power estimation in first domain circuitry 120 computes the signal power and noise power estimates separately. In some implementations, signal power and noise power estimation in first domain circuitry 120 may compute the signal power estimate in a first domain and the noise power estimate in a second domain. In some implementations, signal power and noise power estimation in first domain circuitry 120 may compute the signal power estimate and the noise power estimate in the same domain (e.g., the time domain). Regardless of whether signal power and noise power estimation in first domain circuitry 120 computes the signal and noise power estimates in the same or different domains, signal power and noise power estimation in second domain circuitry 130 computes the signal and noise power estimates in domains different from those of signal power and noise power estimation in first domain circuitry 120. For the sake of brevity and not limitation, only the implementation of signal power and noise power estimation in first domain circuitry 120 will be discussed in connection with FIG. 2. However, the teachings of the implementation of signal power and noise power estimation in first domain circuitry 120 discussed in connection with FIG. 2 are applicable to signal power and noise power estimation in second domain circuitry 130.

Figures 2, 3:
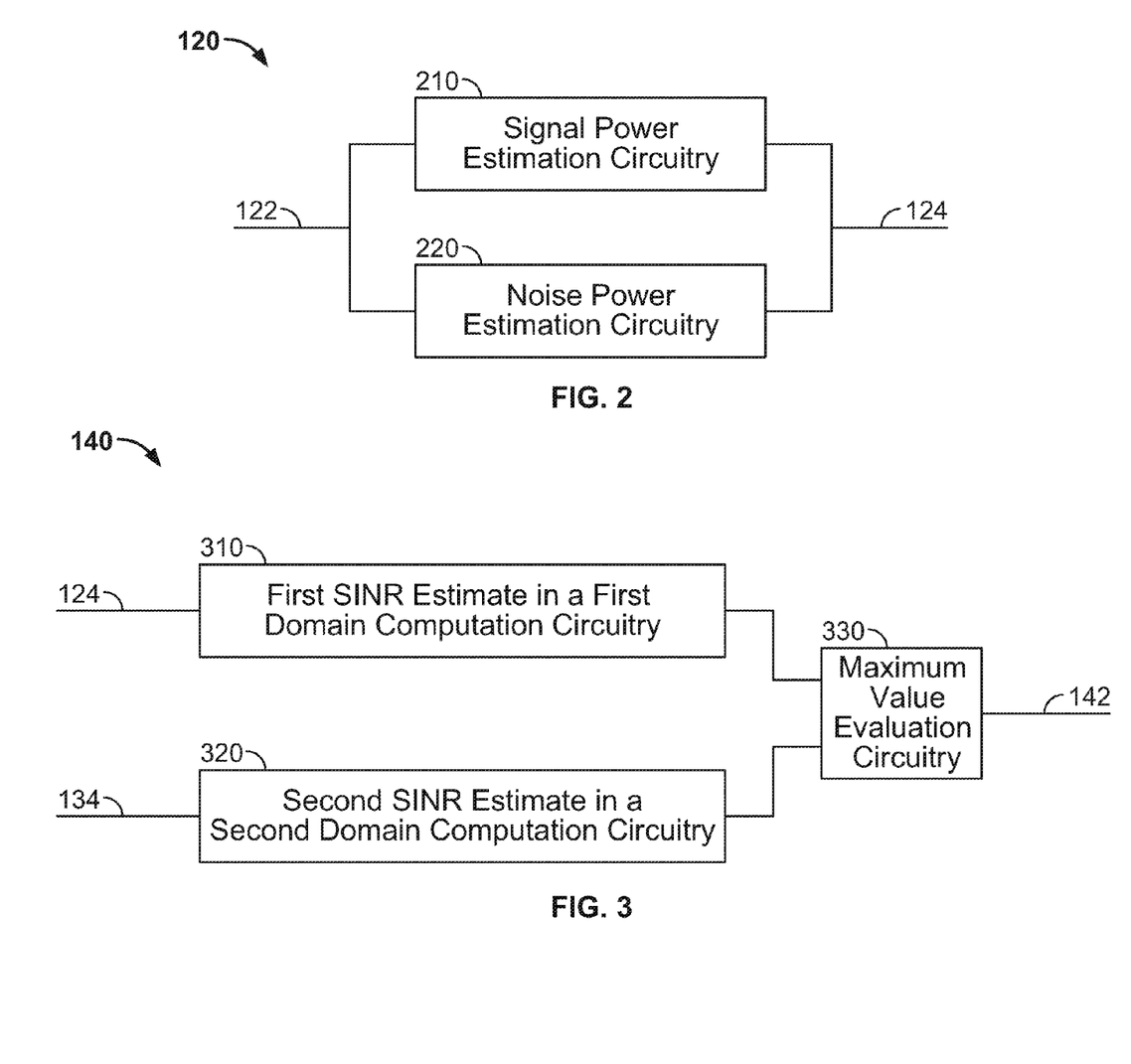
FIG. 2 shows an illustrative signal power and noise power estimation circuitry in accordance with an embodiment of the present disclosure.
FIG. 3 shows an illustrative signal power and noise power estimation selection circuitry in accordance with an embodiment of the present disclosure.

FIG. 2 shows an illustrative signal power and noise power estimation in first domain circuitry 120 in accordance with an embodiment of the present disclosure. Signal power and noise power estimation in first domain circuitry 120 includes a signal power estimation circuitry 210 and a noise power estimation circuitry 220. In some embodiments, noise power estimation circuitry 220 computes the noise power estimation with frequency domain channel estimate filtering. In some implementations, the channel estimate filtering may include a 3-tap filter. For example, noise power estimation circuitry 220 may compute the noise power in the frequency domain in accordance with equation 2 below:

$$\hat{P}_Z = \eta_z \frac{\sum_{m=0}^{N_S-1} \sum_{k \in P_m} |Y_m[k] - X_m[k]\hat{H}_m[k]|^2}{N_S N_P} \quad (2)$$

$$= (1+\alpha_z)\sigma_Z^2 + \beta_z P_S$$

$$\hat{H}_m[k] = \sum_{h=\lfloor M_n/2 \rfloor - M_n+1}^{h=\lfloor M_n/2 \rfloor} g(h)\tilde{H}_m[k+hN_f]$$

$$(\tilde{H}_m[q] = Y_m[q]/X_m[q])$$

where $\hat{H}_m[k]$ is the frequency domain channel estimate for signal power estimation, $M_n$ is the number of filter taps, $\eta_z$ is a scaling factor, $\alpha_z$ and $\beta_z$ are undesired terms which depend on the channel estimate (CE) filter and channel conditions, $N_S$ is the number of pilot symbols, $N_P$ is the number of pilot subcarriers, $P_m$ is the set of pilot subcarriers, $P_S$ is the average desired signal power in the received pilot symbols, g(h) is the coefficient of tap h of the channel filter, $\sigma_Z^2$ is the average noise power in the received pilot symbols and k is a frequency index. In some implementations, noise power estimation circuitry 220 may compute the noise power in the time domain in accordance with equation 2 where $$\hat{H}_m[k] = \sum_{h=\lfloor M_n/2 \rfloor - M_n+1}^{h=\lfloor M_n/2 \rfloor} g(h)\tilde{H}_{m+hN_t}[k].$$

In some implementations, noise power estimation circuitry 220 may compute the noise power in the time and frequency domain in accordance with equation 2 where $$\hat{H}_m[k] = \sum_{h=\lfloor M_n/2 \rfloor - M_n+1}^{h=\lfloor M_n/2 \rfloor} g(h)\tilde{H}_{m+hN_t'}[k+hN_f']$$

where $N'_t (\leq N_t)$ and $N'_f (\leq N_f)$ correspond to spacings in time and frequency from a closest pilot in time/frequency domain.

In some implementations, signal power estimation circuitry 210 computes the signal power estimate of the received signal with frequency domain channel estimate filtering. In some implementations, the channel estimate filtering may include a 2-tap filter and different channel estimate filters are used in computing the signal power estimation and the noise power estimation. For example, signal power estimation circuitry 210 may compute the signal power estimate in the frequency domain in accordance with equation 3 below:

$$\hat{P}_S = \frac{\sum_{m=0}^{N_S-1} \sum_{k \in P_m} |\hat{H}_m[k] X_m[k]|^2}{N_S N_P} \quad (3)$$

$$\approx (1+\alpha_S)P_S + \beta_S \sigma_Z^2$$

where $$\hat{H}_m[k] = \sum_{h=\lfloor M/2 \rfloor - M+1}^{h=\lfloor M/2 \rfloor} w(h)\tilde{H}_m[k+hN_f]$$

$$(\tilde{H}_m[h] = Y_m[h]/X_m[h])$$

where $\sigma_Z^2$ is the average noise power in the received pilot symbols, $\hat{H}_m[k]$ is the frequency domain channel estimate for signal power estimation, $\beta_S$ and $\alpha_S$ are undesired terms similar to $\beta_z$ and $\alpha_z$ defined above, M is the number of channel estimate filter taps, k is a frequency index, w(h) is the coefficient of tap h of the channel filter and $P_S$ is the average desired signal power in the received pilot symbols. All other terms are the same as previously defined. In some implementations, signal power estimation circuitry 210 may compute the signal power in the time domain in accordance with equation 3 where $$\hat{H}_m[k] = \sum_{h=\lfloor M/2 \rfloor - M+1}^{h=\lfloor M/2 \rfloor} w(h)\tilde{H}_{m+hN_t}[k].$$

In some implementations, signal power estimation circuitry 210 may compute the signal power in the time and frequency domain in accordance with equation 3 where $$\hat{H}_m[k] = \sum_{h=\lfloor M_n/2 \rfloor - M_n+1}^{h=\lfloor M_n/2 \rfloor} w(h)\tilde{H}_{m+hN_t'}[k+hN_f'].$$

In some embodiments, signal power estimation circuitry 210 may compute the signal power estimate to compensate for the noise power in the frequency domain in accordance with equation 4 below:

$$\hat{P}_S = \frac{\sum_{m=0}^{N_S-1} \sum_{k \in P_m} |\hat{H}_m[k] X_m[k]|^2}{N_S N_P} - \beta_H \hat{P}_Z \quad (4)$$

$$\approx (1+\alpha_S) P_S + \frac{\beta_S}{(1+\alpha_Z)} \sigma_z^2$$

where $\beta_S = 0$

The signal power estimate to compensate for the noise power may be computed in the time domain or the time/frequency domain in accordance with equation 4 using an $\hat{H}_m[k]$ computation that corresponds to the time or time/frequency domains. In particular, equation 4 is the same for frequency, time and time/frequency domains except that $\hat{H}_m[k]$ is computed differently according to each domain.

In some embodiments, signal power estimation circuitry 210 may compute the signal power estimate without using a channel estimate. In particular, signal power estimation circuitry 210 may compute the signal power estimate in the frequency domain using a differential scheme in accordance with equation 5 below:

$$\hat{P}_S = \frac{\left| \sum_{m=0}^{N_S-1} \sum_{k \in P_m} Y_m[k] Y_m^*[k+N_f] \frac{X_m[k] X_m^*[k+N_f]}{|X_m[k] X_m^*[k+N_f]|} \right|}{N_S(N_P-1)} \quad (5)$$

$$= \frac{\left| \sum_{m=0}^{N_S-1} \sum_{k=0}^{N_P-2} \tilde{H}_m[k] \tilde{H}_m^*[k+N_f] \right|}{N_S(N_P-1)}$$

$$\approx P_S |r_f(N_f)|$$

$$= (1+\alpha_S) P_S + \beta_S \sigma_z^2$$

$$\alpha_S = |r_f(N_f)| - 1 \text{ and } \beta_S = 0$$

where $r_f(N_f)$ is frequency domain channel correlation spaced by $N_f$ subcarriers. In some implementations, signal power estimation circuitry 210 may compute the signal power estimate in the time domain using a differential scheme in accordance with:

$$\hat{P}_S = \frac{\left| \sum_{m=0}^{N_S-2} \sum_{k \in P_m} Y_m[k] Y_{m+N_t}^*[k] \frac{X_m[k] X_{m+N_t}^*[k]}{|X_m[k] X_{m+N_t}^*[k]|} \right|}{(N_S-1) N_P} =$$

$$\frac{\left| \sum_{m=0}^{N_S-2} \sum_{k=0}^{N_P-1} \tilde{H}_m[k] \tilde{H}_{m+N_t}^*[k] \right|}{(N_S-1) N_P}$$

$$\approx P_S |r_t(N_t)|$$

where $r_t(N_t)$ is time-domain channel correlation spaced by $N_t$ symbols. In some implementations, signal power estimation circuitry 210 may compute the signal power estimate in the time and frequency domain using a differential scheme in accordance with:

$$\hat{P}_S = \frac{\left| \sum_{m=0}^{N_S'-2} \sum_{k \in P_m} Y_m[k] Y_{m+N_t'}^*[k+N_f'] \frac{X_m[k] X_{m+N_t'}^*[k+N_f']}{|X_m[k] X_{m+N_t'}^*[k+N_f']|} \right|}{(N_S'-1)(N_P'-1)}$$

$$= \frac{\left| \sum_{m=0}^{N_S'-2} \sum_{k=0}^{N_P'-1} \tilde{H}_m[k] \tilde{H}_{m+N_t'}^*[k+N_f'] \right|}{(N_S'-1)(N_P'-1)}$$

$$= P_S |r_{t,f}(N_t', N_f')|$$

where $r_{t,f}(N_t', N_f')$ is time/frequency domain channel correlation spaced by $N_t'$ symbols and $N_f'$ subcarriers.

In some embodiments, signal power and noise power estimation selection circuitry 140 may determine which domain has the least variation in the fading channel for use in computing the SINR by comparing SINR estimates. FIG. 3 shows an illustrative signal power and noise power estimation selection circuitry 140 in accordance with an embodiment of the present disclosure. Signal power and noise power estimation selection circuitry 140 includes a first SINR estimate in a first domain computation circuitry 310, a second SINR estimate in a second domain computation circuitry 320 and maximum value evaluation circuitry 330.

First SINR estimate in a first domain computation circuitry 310 is coupled to communication link 124 for receiving the signal power and noise power estimates that have been computed in the first domain. First SINR estimate in a first domain computation circuitry 310 may compute a first SINR by dividing the signal power estimate received from circuitry 120 by the noise power estimate received from circuitry 120 (FIG. 1). In some implementations, the signal power estimate received from circuitry 120 has been computed by circuitry 120 in one domain (e.g., time domain) and the noise power estimate received from circuitry 120 has been computed by circuitry 120 in a different second domain (e.g., frequency domain). In some implementations, both the signal power and the noise power estimate are computed by circuitry 120 in the same domain (e.g., time domain, frequency domain, or time and frequency domain). The first SINR estimate is output by first SINR estimate in a first domain computation circuitry 310 to maximum value evaluation circuitry 330.

Second SINR estimate in a second domain computation circuitry 320 is coupled to communication link 134 for receiving the signal power and noise power estimates that have been computed in the second domain. Second SINR estimate in a second domain computation circuitry 320 may compute a second SINR by dividing the signal power estimate received from circuitry 130 by the noise power estimate received from circuitry 130 (FIG. 1). In some implementations, the signal power estimate received from circuitry 130 has been computed by circuitry 130 in one domain (e.g., time domain) and the noise power estimate received from circuitry 130 has been computed by circuitry 130 in a different second domain (e.g., frequency domain). The domain used to compute the signal power estimate and the noise power estimate in circuitry 130 is different than the domain used by circuitry 120 to compute the signal power and noise power estimates. In some implementations, both the signal power and the noise power estimate are computed by circuitry 130 in the same domain (e.g., time domain, frequency domain, or time and frequency domain) but the domain used is different from the domain used in computing the estimates by circuitry 120. The second SINR estimate is output by second SINR estimate in a first domain computation circuitry 320 to maximum value evaluation circuitry 330.

Maximum value evaluation circuitry 330 may determine which domain has the least variation in the fading channel by identifying which of the first and second SINR values received respectively from circuitries 310 and 320 has a greater value. In some implementations, maximum value evaluation circuitry 330 may include a comparator circuit (e.g., op-amp and/or a subtraction circuitry). The SINR having the greatest value corresponds to the domain with the least variation in the fading channel. For example, maximum value evaluation circuitry 330 may determine that the first SINR estimate provided by first SINR estimate in a first domain computation circuitry 310 is greater than the second SINR estimate provided by second SINR estimate in a second domain computation circuitry 320. Accordingly, maximum value evaluation circuitry 330 may determine that the first domain computation of signal power and noise estimates corresponds to the least channel variation in the fading channel.

In some embodiments, maximum value evaluation circuitry 330 provides the computed SINR estimate corresponding to the domain with the least variation to utilization circuitry. In some embodiments, maximum value evaluation circuitry 330 provides the signal power and noise power estimates corresponding to the domain with the least variation to SINR estimate computation circuitry 150 for computing the SINR estimate of the received signal.

Figure 4:
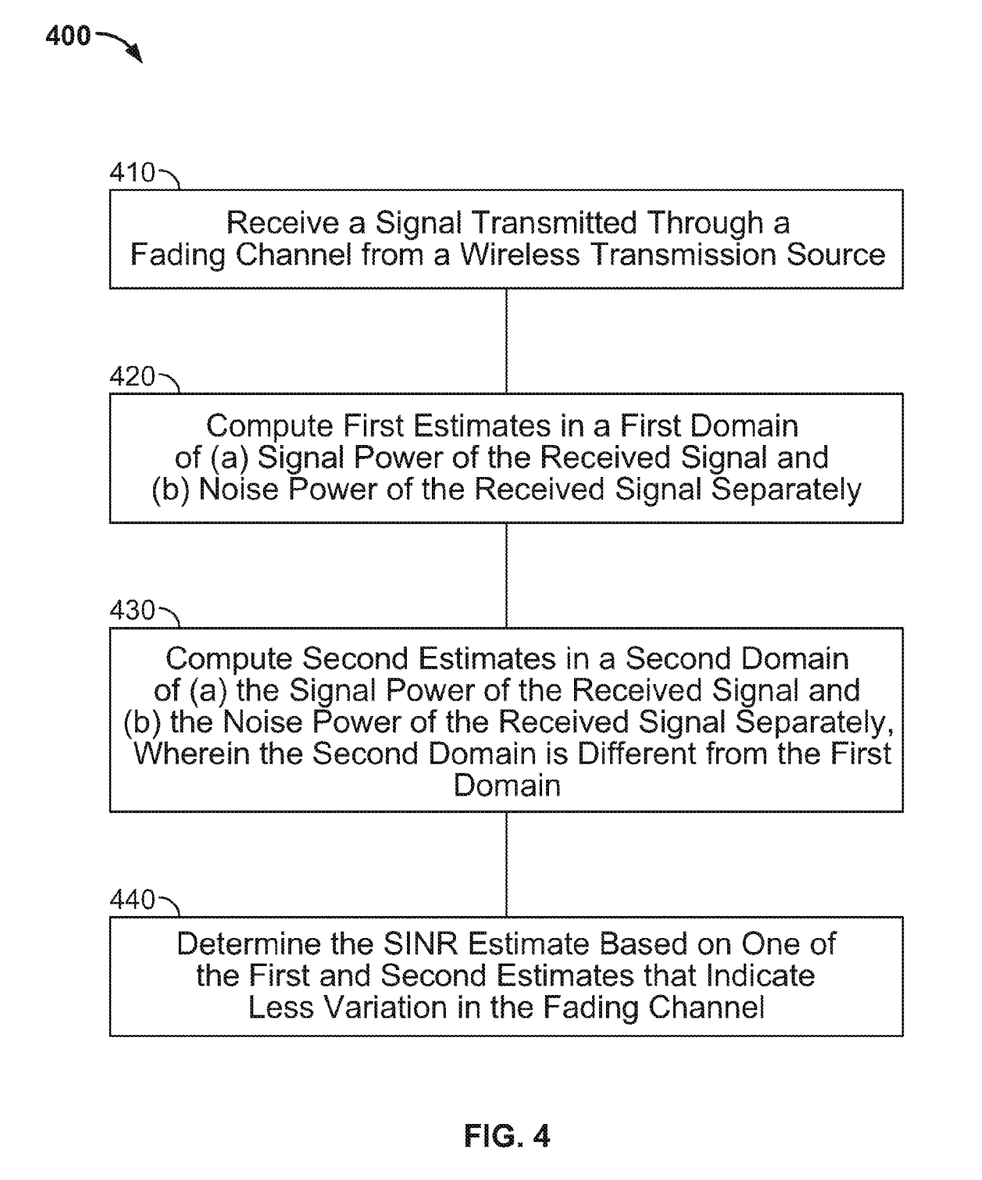
FIG. 4 is an illustrative flow diagram for performing SINR estimation based on multiple domains in accordance with embodiments of the present disclosure.

FIG. 4 is an illustrative flow diagram 400 for performing SINR estimation based on multiple domains in accordance with embodiments of the present disclosure. At 410, a signal transmitted through a fading channel from a wireless transmission source is received. For example, receiver circuitry 110 receives an OFDM signal using one or more antennas 114 (FIG. 1).

At 420, first estimates of (a) signal power of the received signal and (b) noise power of the received signal are computed in a first domain separately. For example, signal power and noise power, estimation in first domain circuitry 120 receives the received signal from receiver circuitry 110 and computes a signal power and noise power of the received signal in a first domain (FIG. 1). In particular, signal power and noise power estimation in first domain circuitry 120 may compute the signal power and noise power in the time domain. Alternatively, signal power and noise power estimation in first domain circuitry 120 may compute the signal power in the time domain and the noise power in the frequency domain.

At 430, second estimates of (a) the signal power of the received signal and (b) the noise power of the received signal are computed in a second domain separately, where the second domain is different from the first domain. For example, signal power and noise power estimation in first domain circuitry 130 receives the received signal from receiver circuitry 110 and computes a signal power and noise power of the received signal in a second domain that is different from the domain used in signal power and noise power estimation in first domain circuitry 120 (FIG. 1). In particular, signal power and noise power estimation in second domain circuitry 130 may compute the signal power and noise power in the frequency domain while signal power and noise power estimation in first domain circuitry 120 computes the signal power and noise power in the time domain. Alternatively, signal power and noise power estimation in second domain circuitry 130 may compute the signal power in the time domain and the noise power in the frequency domain while signal power and noise power estimation in first domain circuitry 120 computes the signal power in the frequency domain and the noise power in the time domain.

At 440, the SINR estimate of the received signal is determined based on one of the first and second estimates that indicate less variation in the fading channel. For example, signal power and noise power estimation selection circuitry 140 may receive the signal power and noise power estimates corresponding to different domains from circuitries 120 and 130 (FIG. 1). Signal power and noise power estimation selection circuitry 140 may compute a first SINR value based on values of the signal power and noise power corresponding to the first domain. Signal power and noise power estimation selection circuitry 140 may compute a second SINR value based on values of the signal power and noise power corresponding to the second domain. Signal power and noise power estimation selection circuitry 140 may determine whether the first or the second estimates indicate less variation in the fading channel by comparing the two SINR values. In particular, signal power and noise power estimation selection circuitry 140 may determine that the larger of the two SINR values indicates less variation in the fading channel and may accordingly select the signal power and noise power estimates of the domain corresponding to the larger SINR value for further processing.

The above steps of the flow diagram of FIG. 4 may be executed or performed in any order or sequence not limited to the order and sequence shown and described in the figure. Also, some of the above steps of the flow diagram of FIG. 4 may be executed or performed substantially simultaneously where appropriate or in parallel to reduce latency and processing times:

The above described embodiments of the present disclosure are presented for purposes of illustration and not of limitation, and the present disclosure is limited only by the claims which follow.

What is claimed is:

1. A method for estimating signal to interference and noise power ratio (SINR), the method comprising:
   receiving a signal transmitted through a fading channel from a wireless transmission source;
   separately computing first estimates in a first domain of (a) signal power of the received signal and (b) noise power of the received signal;
   separately computing second estimates in a second domain of (a) the signal power of the received signal and (b) the noise power of the received signal, wherein the second domain is different from the first domain;
   selecting one of the first and second estimates that indicates less variation in the fading channel based on a comparison of values associated with each one of the first and second estimates with each other; and
   determining an SINR estimate based on the selected one of the first and second estimates.

2. The method of claim 1, wherein the signal is a orthogonal frequency division multiplexing (OFDM) signal.

3. The method of claim 1 further comprising:
   computing a first SINR estimate of the received signal based on the first estimates; and
   computing a second SINR estimate of the received signal based on the second estimates.

4. The method of claim 3, further comprising:
   determining which of the first SINR estimate and the second SINR estimate has a larger value; and
   selecting the one of the first SINR estimate and the second SINR estimate having the larger value to determine the SINR estimate.

5. The method of claim 1, further comprising:
computing, in the first domain, a first auto-correlation value corresponding to the first estimates; and
computing, in the second domain, a second auto-correlation value corresponding to the second estimates.

6. The method of claim 5, further comprising:
determining which of the first auto-correlation value and the second auto-correlation value has a larger value, wherein one of the first auto-correlation value and the second auto-correlation value having a larger value indicates less variation in the fading channel,
wherein determining the SINR estimate comprises computing the SINR estimate based on one of the first auto-correlation value and the second auto-correlation value having the larger value.

7. The method of claim 6, wherein:
the first and second auto-correlation values are computed for the first and second signal power estimates in the first and the second domains, respectively; and
the first and second noise power estimates are computed in accordance with a noise power channel estimation filter in the first and the second domains, respectively.

8. The method of claim 1, wherein the first domain and second domain are selected from the group consisting of a time domain, a frequency domain, and a time and frequency domain.

9. The method of claim 1 further comprising:
separately computing a plurality of estimates in a plurality of domains of (a) the signal power of the received signal and (b) the noise power of the received signal, wherein the plurality of domains are different from each other and different from the first domain and the second domain; wherein
the selecting further comprises selecting one of the first estimates, the second estimates and the plurality of estimates; and
the determining further comprises determining the SINR estimate based on selected one of the first estimates, the second estimates and the plurality of estimates that indicate less variation in the fading channel.

10. The method of claim 1 wherein:
the first estimate of the signal power is computed in accordance with a signal power channel estimation filter in the first domain;
the first estimate of the noise power is computed in accordance with a noise power channel estimation filter in the first domain;
the second estimate of the signal power is computed in accordance with the signal power channel estimation filter in the second domain; and
the second estimate of the noise power is computed in accordance with the noise power channel estimation filter in the second domain.

11. A system for estimating signal to interference and noise ratio (SINR), the system comprising:
receiver circuitry configured to receive a signal transmitted through a fading channel from a wireless transmission source; and
processing circuitry configured to:
separately compute first estimates in a first domain of (a) signal power of the received signal and (b) noise power of the received signal;
separately compute second estimates in a second domain of (a) the signal power of the received signal and (b) the noise power of the received signal, wherein the second domain is different from the first domain;
select one of the first and second estimates that indicates less variation in the fading channel based on a comparison of values associated with each one of the first and second estimates with each other; and
determine an SINR estimate based on the selected one of the first estimates and the second estimates.

12. The system of claim 11 wherein the signal is a orthogonal frequency division multiplexing (OFDM) signal.

13. The system of claim 11, wherein the processing circuitry is further configured to:
compute a first SINR estimate of the received signal based on the first estimates; and
compute a second SINR estimate of the received signal based on the second estimates.

14. The system of claim 13, wherein the processing circuitry is further configured to:
determine which of the first SINR estimate and the second SINR estimate has a larger value; and
select the one of the first SINR estimate and the second SINR estimate having the larger value to determine the SINR estimate.

15. The system of claim 11, wherein the processing circuitry is further configured to:
compute, in the first domain, a first auto-correlation value corresponding to the first estimates; and
compute, in the second domain, a second auto-correlation value corresponding to the second estimates.

16. The system of claim 15, wherein the processing circuitry is further configured to:
determine which of the first auto-correlation value and the second auto-correlation value has a larger value, wherein one of the first auto-correlation value and second auto-correlation value having a larger value indicates less variation in the fading channel,
wherein the processing circuitry is further configured to determine the SINR estimate by computing the SINR estimate based on one of the first auto-correlation value and second auto-correlation value having the larger value.

17. The system of claim 16, wherein:
the first and second auto-correlation values are computed for the first and second signal power estimates in the first and the second domains, respectively; and
the first and second noise power estimates are computed in accordance with a noise power channel estimation filter in the first and the second domains, respectively.

18. The system of claim 11, wherein the first domain and the second domain are selected from the group consisting of a time domain, a frequency domain, and a time and frequency domain.

19. The system of claim 11, wherein the processing circuitry is further configured to:
separately compute a plurality of estimates in a plurality of domains of (a) the signal power of the received signal and (b) the noise power of the received signal, wherein the plurality of domains are different from each other and different from the first domain and the second domain;
wherein the processing circuitry is configured to select one of the first estimates, the second estimates and the plurality of estimates and determine the SINR estimate based on one of the selected first estimates, the second estimates and the plurality of estimates that indicate less variation in the fading channel.

20. The system of claim 11, wherein:
the first estimate of the signal power is computed in accordance with a signal power channel estimation filter in the first domain;
the first estimate of the noise power is computed in accordance with a noise power channel estimation filter in the first domain;
the second estimate of the signal power is computed in accordance with the signal power channel estimation filter in the second domain; and
the second estimate of the noise power is computed in accordance with the noise power channel estimation filter in the second domain.

* * * * *